United States Patent [19]

Betensky et al.

[11] Patent Number: 5,745,301
[45] Date of Patent: Apr. 28, 1998

[54] VARIABLE POWER LENS SYSTEMS FOR PRODUCING SMALL IMAGES

[75] Inventors: Ellis I. Betensky, Toronto, Canada; Melvyn H. Kreitzer; Jacob Moskovich, both of Cincinnati, Ohio

[73] Assignee: BenOpcon, Inc., Cincinnati, Ohio

[21] Appl. No.: 358,927

[22] Filed: Dec. 19, 1994

[51] Int. Cl.$^6$ .................................................. G02B 15/14
[52] U.S. Cl. .......................................... 359/689; 359/687
[58] Field of Search .............................. 359/689, 686, 359/683, 690, 687

[56] References Cited

U.S. PATENT DOCUMENTS

| | | |
|---|---|---|
| 3,415,592 | 12/1968 | Price .......................................... 359/687 |
| 4,509,833 | 4/1985 | Ikemori . |
| 4,586,793 | 5/1986 | Tanaka et al. . |
| 4,603,948 | 8/1986 | Imai . |
| 4,726,667 | 2/1988 | Tachihara . |
| 4,730,907 | 3/1988 | Kikuchi et al. . |
| 4,733,952 | 3/1988 | Fujioka . |
| 4,759,617 | 7/1988 | Tokumaru et al. . |
| 4,775,228 | 10/1988 | Ikemori et al. . |
| 4,810,071 | 3/1989 | Tsuchida et al. . |
| 4,810,072 | 3/1989 | Takahashi . |
| 4,818,082 | 4/1989 | Kreitzer . |
| 4,824,223 | 4/1989 | Doctor et al. . |
| 4,838,666 | 6/1989 | Shiraishi . |
| 4,838,668 | 6/1989 | Betensky et al. . |
| 4,844,599 | 7/1989 | Ito . |
| 4,846,562 | 7/1989 | Tokumaru et al. . |
| 4,906,079 | 3/1990 | Mihara et al. . |
| 5,009,491 | 4/1991 | Hata . |
| 5,015,077 | 5/1991 | Ueda . |
| 5,035,492 | 7/1991 | Ito . |
| 5,054,897 | 10/1991 | Ozawa . |
| 5,132,848 | 7/1992 | Nishio et al. . |
| 5,218,477 | 6/1993 | Ito . |
| 5,223,982 | 6/1993 | Suzuki et al. . |
| 5,268,790 | 12/1993 | Chen .......................................... 359/690 |
| 5,268,792 | 12/1993 | Kreitzer et al. ......................... 359/689 |
| 5,357,374 | 10/1994 | Ohno ......................................... 359/689 |
| 5,434,710 | 7/1995 | Zozawa ..................................... 359/689 |
| 5,485,313 | 1/1996 | Betensky ................................. 359/689 |

OTHER PUBLICATIONS

Rose et al., "Physical Limits to the Performance of Imaging Systems," *Physics Today*, Sep. 1989, pp. 24–32.

Séquin et al., "Charge Transfer Devices," *Advances in Electronics and Electron Physics*, suppl. 8, L. Marton editor, Academic Press, New York, 1975, pp. v–viii.

C. Londoño, "Design and Fabrication of Surface Relief Diffractive Optical Elements, or Kinoforms, with Examples for Optical Athermalization," Ph.D. diss., Tufts University, 1992.

W.C. Sweatt, "Mathematical Equivalence between a Holographic Optical Element and an Ultra High Index Lens," *Journal of the Optical Society of America*, 69:486–487, 1979.

*Primary Examiner*—Scott J. Sugarman
*Attorney, Agent, or Firm*—Maurice M. Klee

[57] ABSTRACT

Variable power lens systems for use with electronic imaging systems, e.g., systems employing CCDs, are provided. The systems take advantage of the fact that the images detected by electronic imaging systems are small, e.g., the image diagonal can be 5.5 millimeters or less. The lens systems employ thick lens elements, whose diameters and thicknesses are large relative to the image size, and large air spaces between lens elements. The systems also employ weak lens units. In this way, simplified lens designs having excellent optical properties at less cost are provided. In certain embodiments, the lens systems contain only three lens elements, e.g., a negative first lens element, a positive second lens element for zooming, and a positive third lens element, with the first and/or the third lens element serving as a compensator.

35 Claims, 9 Drawing Sheets

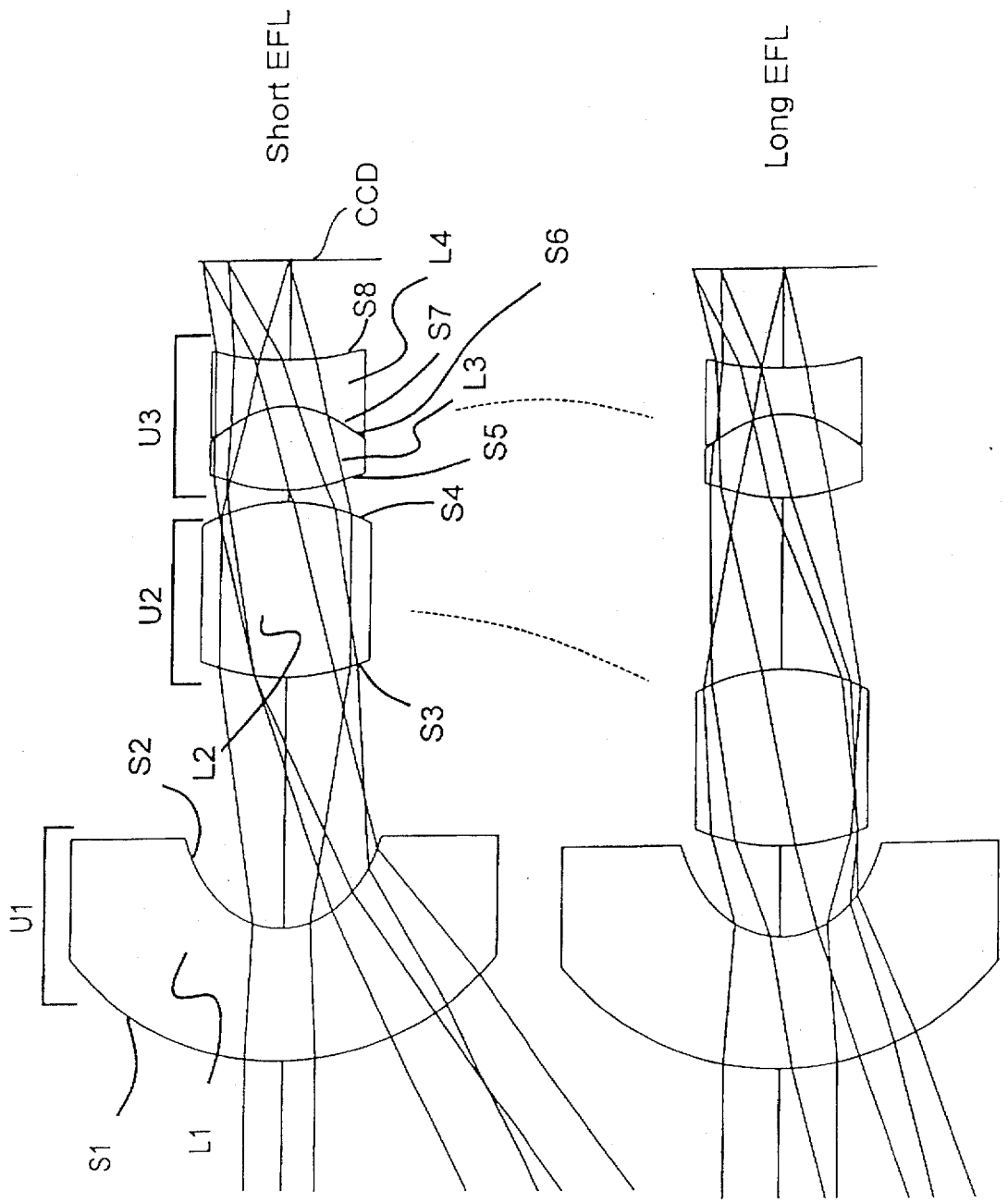

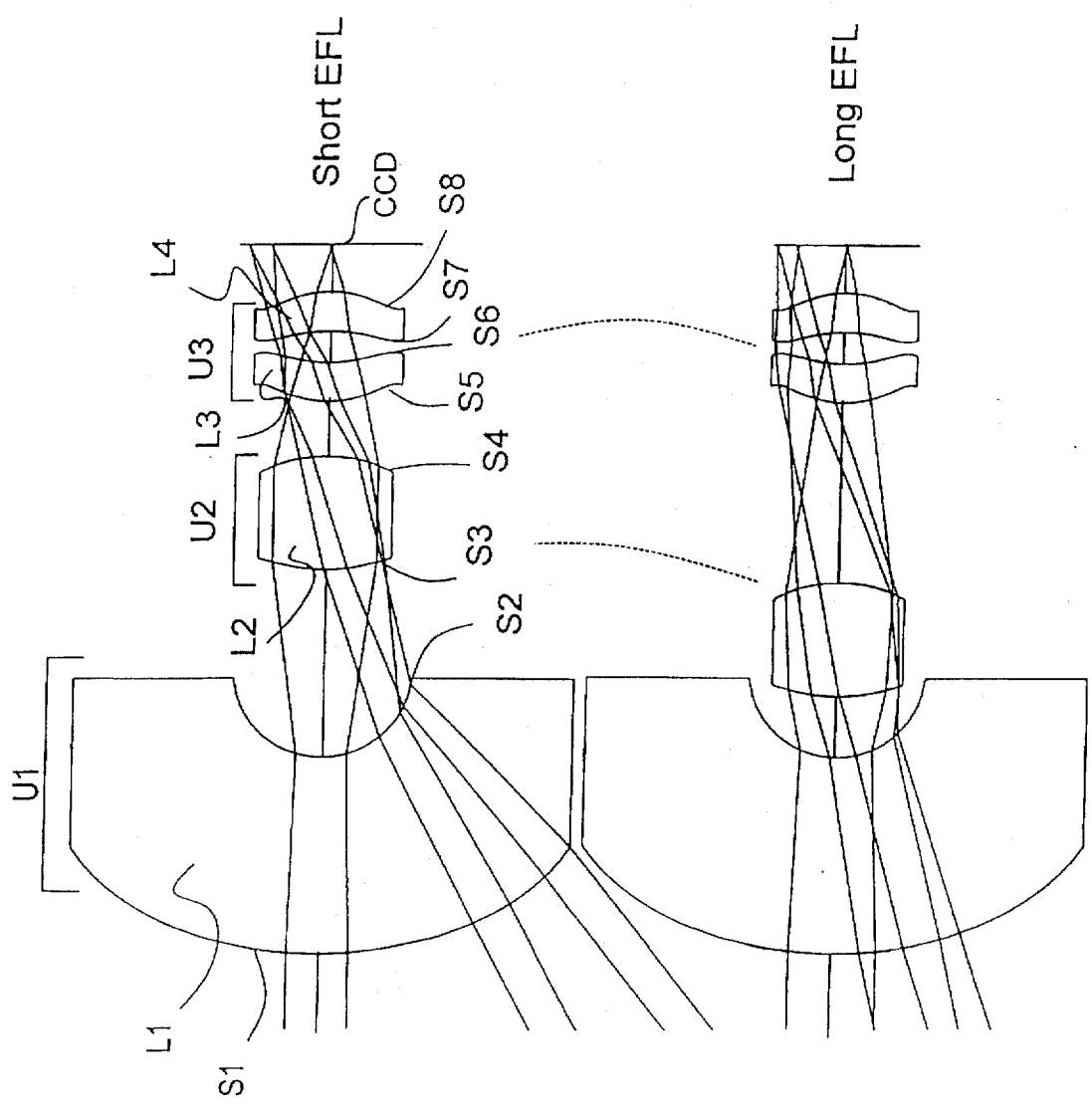

VARIABLE POWER LENS SYSTEMS FOR PRODUCING SMALL IMAGES

FIELD OF THE INVENTION

This invention relates to variable power lens systems, particularly zoom lens systems, for use in producing small images. In certain embodiments of the invention, the small images produced by the lens system are detected by an electronic imaging system, e.g., a system employing a charged coupled device (CCD) or similar light sensitive electronic component. Such systems are well known in the art and descriptions thereof can be found in various references, including Rose et al., "Physical Limits to the Performance of Imaging Systems," *Physics Today*, September 1989, pages 24–32 and the references cited therein; and Séquin et al., "Charge Transfer Devices," *Advances in Electronics and Electron Physics*, suppl. 8, L. Marton editor, Academic Press, New York, 1975, the relevant portions of all of which are incorporated herein by reference.

BACKGROUND OF THE INVENTION

Electronic imaging systems have the advantage of being able to work with images of small size. For example, CCDs having a diagonal of approximately 4 mm (known as ¼ inch CCDs) are widely available. CCDs having diagonals of 5.5 mm (⅓ inch CCDs) are also widely used. Within this small size, a typical CCD will have over 200,000 pixels, thus giving the device a resolution on the order of 70 cycles per millimeter at the surface of the CCD.

In the past, fixed focal length lens systems have been used with CCDs. For many applications, such systems are inadequate because a fixed focal length system cannot simultaneously provide a large angle of view and sufficient resolution to allow detailed examination of specific parts of the field of view. Although electronic zooming can be performed, i.e., zooming wherein a portion of the field is selected and electronically magnified to fill the entire viewing screen, such zooming does not increase the resolution of the original image captured by the CCD. Alternatively, the resolution of the original image can be improved by increasing the number of CCD pixels, but this approach significantly adds to the cost of the device and diffraction effects limit the extent to which pixel size can be reduced.

There thus exists a need for variable power lens systems for use with electronic imaging systems. As known in the art, variable power lens systems can have a discrete number of focal lengths at which the image is in focus at a fixed location, e.g., a dual power system, or can have a focal length which can vary continuously while producing a focused image at a fixed location, e.g., a zoom lens system. Alternatively, the image location need not be kept fixed, in which case, either the detecting device, e.g., the CCD, or the lens system can be moved as the focal length of the lens system is varied either discretely or continuously. The present invention provides variable power lens systems for use with any of these configurations.

A variety of zoom lens systems are known in the art. Examples include Tsuchida et al., U.S. Pat. No. 4,810,071, Mihara et al., U.S. Pat. No. 4,906,079, Hata, U.S. Pat. No. 5,009,491, and Ozawa, U.S. Pat. No. 5,054,897. Lens systems of these types have been developed in accordance with the following principles of conventional lens design practice:

(1) The manufacturing cost of a lens element is primarily determined by the volume of the element and its surface area. For this reason, for most commercial applications, lens designers try to minimize lens element diameters and thicknesses relative to the image size.

(2) In zoom lens design, one or both of the pupils typically moves during zooming. This means that lens diameters must be increased to transmit the entire imaging bundle throughout the zooming range. To minimize this increase in lens diameters (see principle (1) above), lens designers typically use lens elements of relatively large powers. This, in turn, results in increased aberration contributions because of the large powers, and necessitates the inclusion of more lens elements for aberration correction. Conventional wisdom, however, has been to opt for more lens elements, as opposed to larger elements.

Ohno, U.S. Pat. No. 5,357,374, discloses a zoom lens system for use in a photographic camera that employs three lens elements in a negative-positive-negative or a negative-positive-positive arrangement. The Ohno lens system employs strong, thin lens elements which introduce substantial aberrations into the system such that the smallest f-number reported for any of Ohno's examples is 7.6. The Ohno system is limited to such relatively small apertures since the aberrations of the system would become excessive if the aperture were increased. In contrast, the lens systems of the present invention achieve large apertures through the use of weak, thick lens elements.

SUMMARY OF THE INVENTION

In accordance with the present invention, it has been found that the conventional approaches discussed above lead to overly expensive and complicated designs when applied to the problem of providing a large aperture, variable power lens system which produces a small image suitable for detection by an electronic imaging system. Specifically, in accordance with the invention, it has been found that by increasing the thicknesses of lens elements relative to the image size, as well as by increasing air spaces between lens elements, simplified lens designs having excellent optical properties at less cost can be provided. In particular, in certain embodiments, lens units containing only one lens element can be used with the system still having excellent overall aberration correction.

This effect occurs because although manufacturing costs are reduced as the volume of a lens element goes down, a point is reached where this cost reduction levels off. This point of diminishing cost reduction generally corresponds to lens elements whose diameters are less than about 10 millimeters. As such, these diameters are large relative to the size of the images which are detected by electronic imaging systems, even though from a cost point of view the lens elements are small.

Accordingly, thick lens elements whose diameters and thicknesses are large relative to the image size, but whose absolute size is small, are used in the practice of the present invention. Such thick lens elements allow for the use of lens surfaces having reduced power. This, in turn, reduces the aberrations produced by the surfaces. In addition, because the lens elements have an overall small absolute size, they can be economically molded in either glass or plastic. Such molding, in turn, permits the use of aspherical surfaces, which can be configured to further reduce the aberrations of the system.

The variable power lens systems of the invention include three lens units. The first and second lens units from the object end of the system have a negative and a positive power, respectively. The third lens unit generally has a positive power, but may be negative in some cases. Each of the three lens units includes one or more lens elements.

The first and second units have powers whose magnitudes are small relative to the overall strongest power of the system. In particular, the absolute values of the focal lengths of at least one and preferably both of the first and second units of the lens system is greater than about 1.3 times $f_{min}$, where $f_{min}$ is the focal length of the system at its shortest focal length position, i.e., its widest field of view. Similarly, the third lens unit is generally also weak, i.e., its focal length is generally greater than about 1.3 times $f_{min}$.

In addition to having weak lens units, the lens systems of the invention also have thick lens elements. In particular, the lens systems include at least one lens element whose thickness is greater than about 0.5 times $f_{min}$, and preferably include at least two such lens elements and in some cases at least three such elements. In some embodiments, one of the thick lens elements may be part of a color correcting doublet (see Example 7).

In certain embodiments of the invention, the first lens unit and/or the second lens unit includes a surface which has a relatively strong power in comparison to the overall power of the unit in which it is contained. These strong surfaces serve to provide aberration correction for the lens system.

In other embodiments, the third lens unit has a positive power and includes a surface at its image side that is concave to the image. This surface also provides aberration correction for the lens system.

As illustrated by the examples presented below, the invention can provide variable power lens systems and, in particular, zoom lens systems having a limited number of lens elements, each of low power relative to the overall power of the system, e.g., in some cases, only three lens elements of relatively low power, rather than many lens elements at least some of which are very strong, as in the prior art. Such lens systems provide a cost effect way to produce small images of varying magnification for detection by an electronic imaging system.

BRIEF DESCRIPTION OF THE DRAWINGS

FIGS. 1 through 9 are schematic side views of lens systems constructed in accordance with the invention. The upper portion of each of these figures shows the lens system in its short effective focal length (EFL) configuration, while the lower portion shows it in its long EFL configuration.

Figure 1:
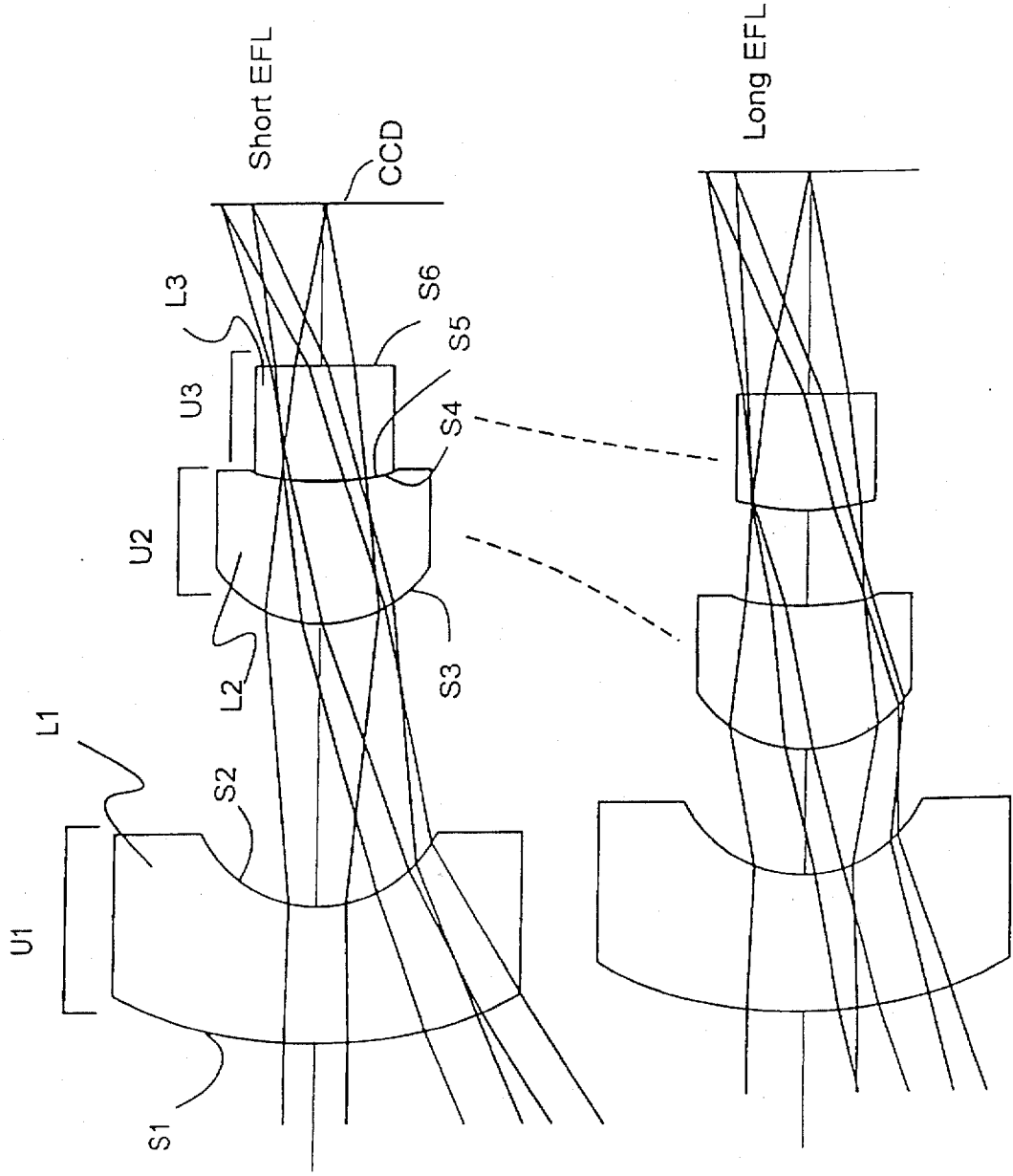

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to variable focal length lens systems employing weak lens units and lens elements of substantial thickness. By utilizing weak units, thick elements, and aspheric surfaces, the invention can achieve large apertures of f/2.0 or less and a wide total field of view of 70 degrees or more.

Also, a wide range of zoom ratios can be achieved. In particular, in the simplest case, a 2:1 zoom ratio can be achieved using just three single lens elements, i.e., a negative first lens element, a positive second lens element that moves to effect a change of internal magnification during zooming, and a positive third lens element, where either or both of the first and third lens elements moves to provide compensation when zooming.

If the focal length is increased, either by increasing the zoom ratio or by changing the zooming region to longer focal lengths, then correction of residual chromatic aberrations may be necessary. This can be achieved by compounding only the third lens unit. (As used herein and in the claims, a compounded component, e.g., a doublet, is not a "single lens element.")

As an alternative, the third lens unit can include a diffractive surface to correct the chromatic aberration, e.g., the third lens unit can be composed of an element that is fabricated as a refractive-diffractive hybrid element. The fabrication of such elements is well known in the art. See, for example, C. Londoño, "Design and Fabrication of Surface Relief Diffractive Optical Elements, or Kinoforms, with Examples for Optical Athermalization," Ph.D. diss., Tufts University, 1992, and the references cited therein, the relevant portions of all of which are incorporated herein by reference. Diffractive surfaces have the problem of diffraction efficiency, i.e., all orders do not come to a perfect focus. This effect is often seen as "glare". For an electronic imaging system application, the diffraction efficiency problem can be addressed by digital processing of the electronic image.

If desired, chromatic aberration can be corrected in the first and/or the second lens units, either alone or in combination with correction in the third lens unit, although correction in just the third lens unit is most preferred.

For monochromatic CCDs, it is generally not important that the exit pupil of the lens system is telecentric. In this case, the preferred location of the aperture stop is after the second unit. When a telecentric or near telecentric exit pupil is required, e.g., for color CCDs, the aperture stop can be moved to a position before or within the second unit.

If only a change of focal length (field of view) between two extremes is required, the first and third units can be fixed and a positive second unit can be moved to change focal length without requiring refocusing for the two extremes.

To increase the zoom range, a fixed positive lens unit (U4) can be placed before the negative first lens unit. In this design, the negative first lens unit becomes the focal length variator for zooming and the positive second lens unit becomes the compensator. As illustrated in Example 6, the second and third lens units can be moved together for compensating, if desired.

Because the lens units making up the lens systems of the invention have small mass, they can be easily moved using low powered devices, such as, small motors, electromagnetics, and the like. Accordingly, the lens systems can be mounted directly on a circuit board which carries a CCD or similar device.

EXAMPLES

Figure 2:
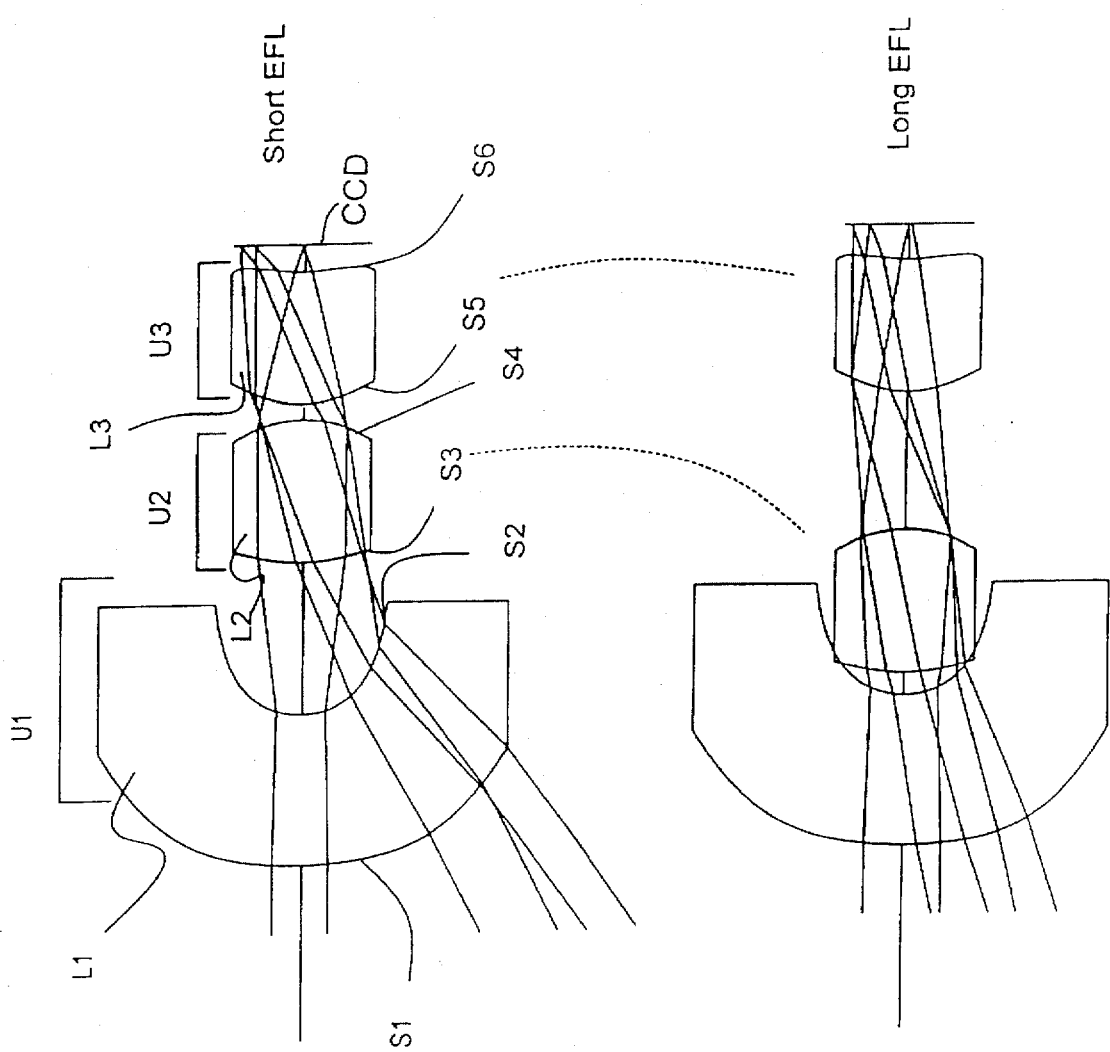
Figure 3:
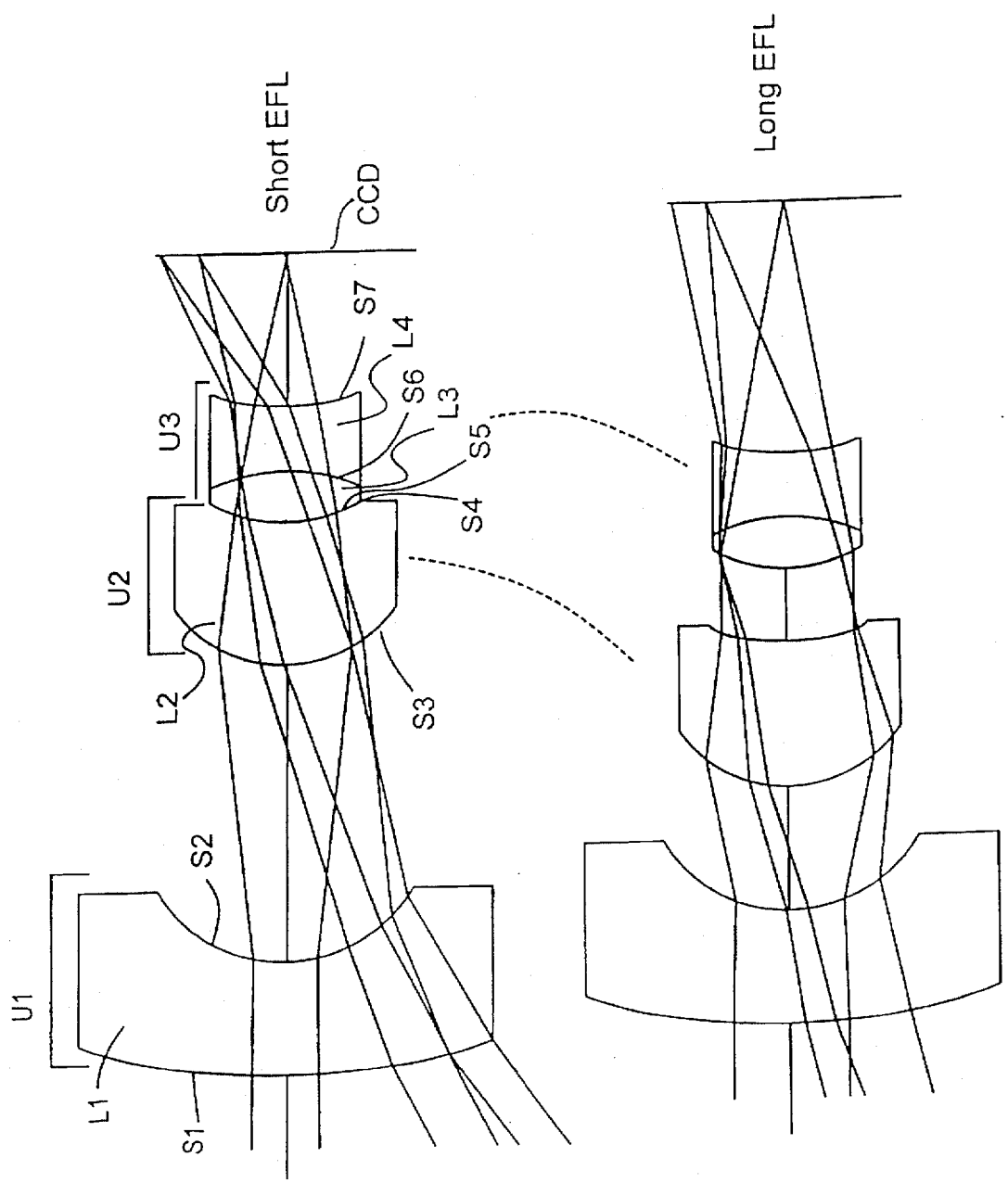
Figure 4:
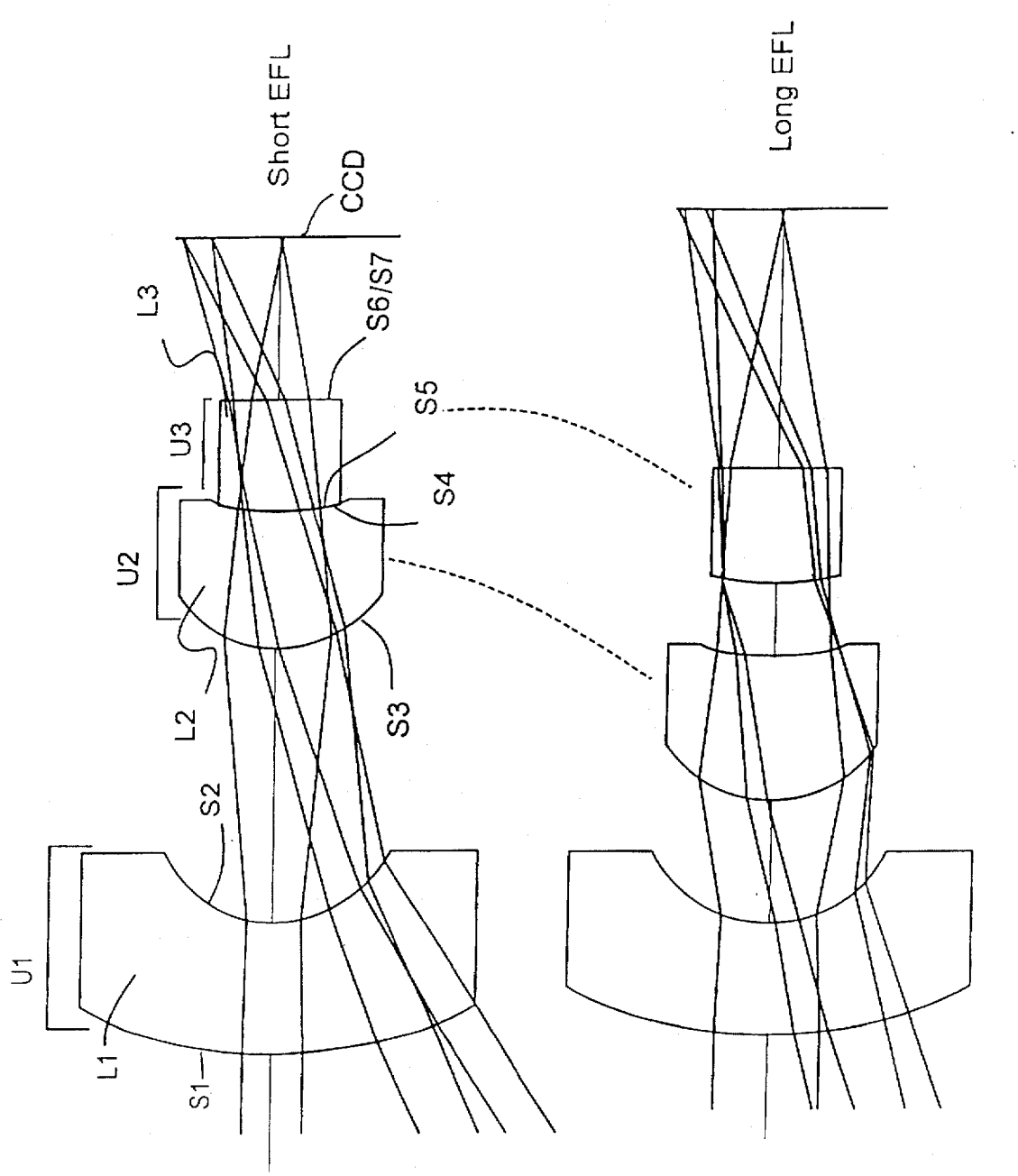
Figure 5:
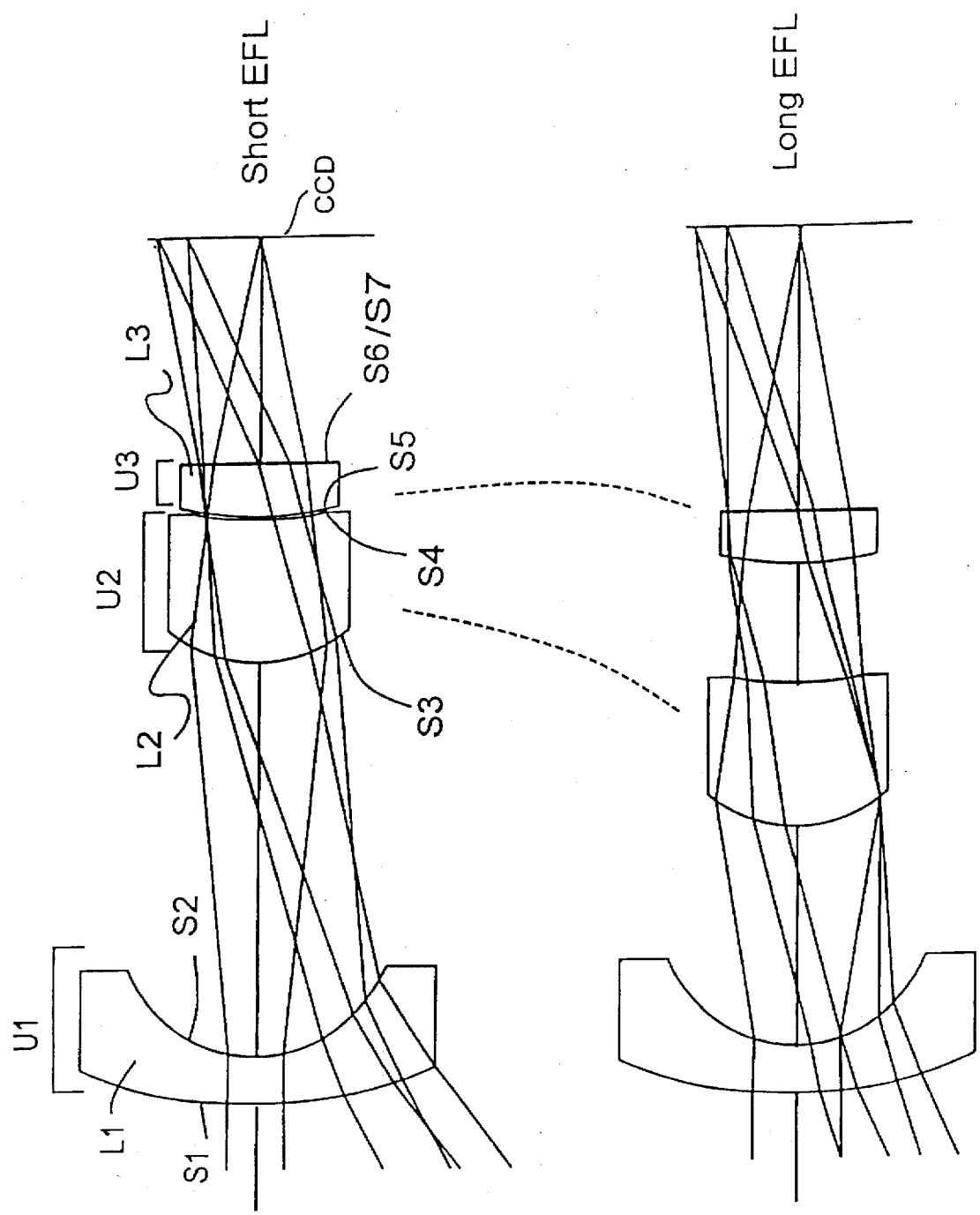
Figure 6:
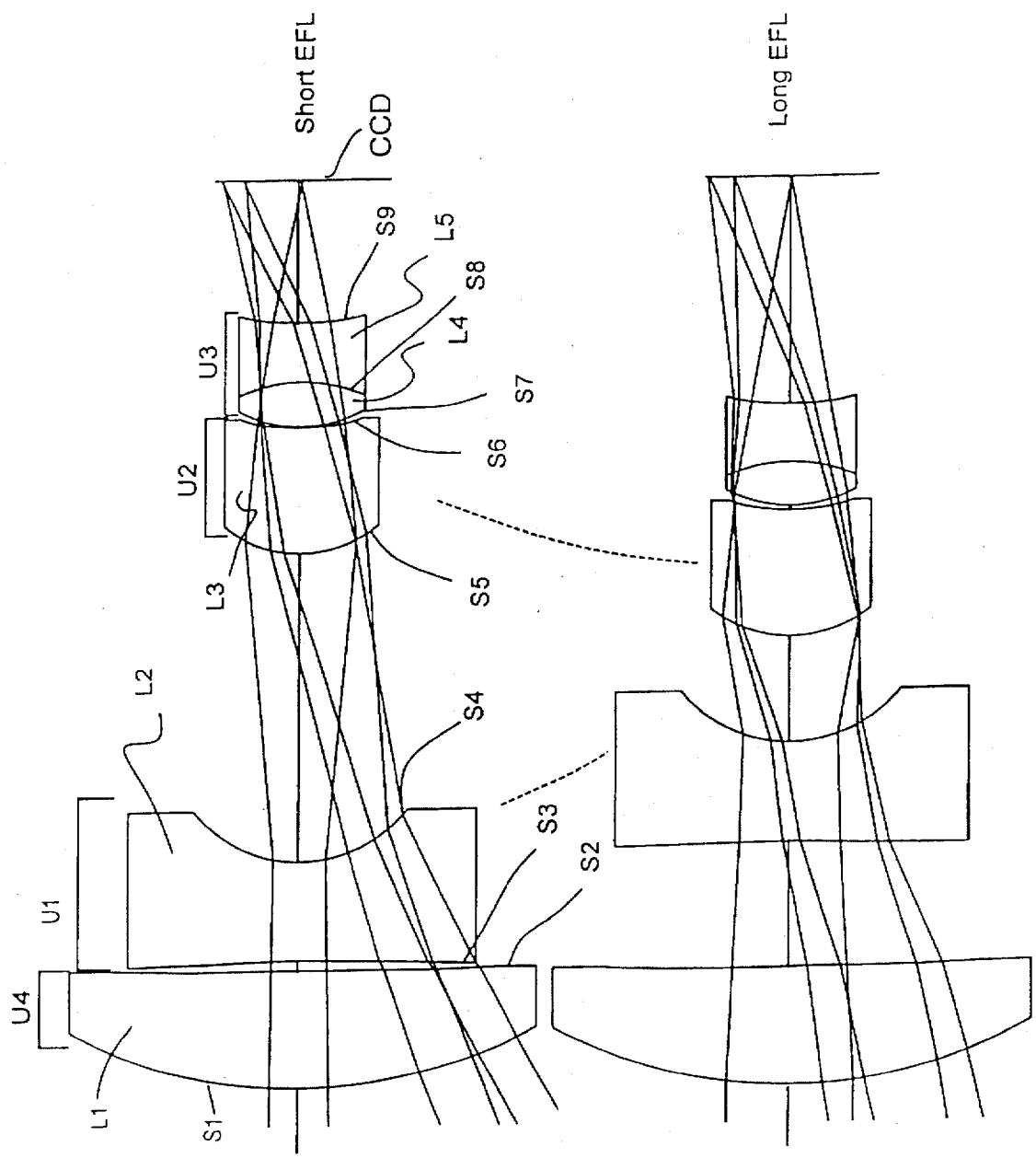
Figure 7:
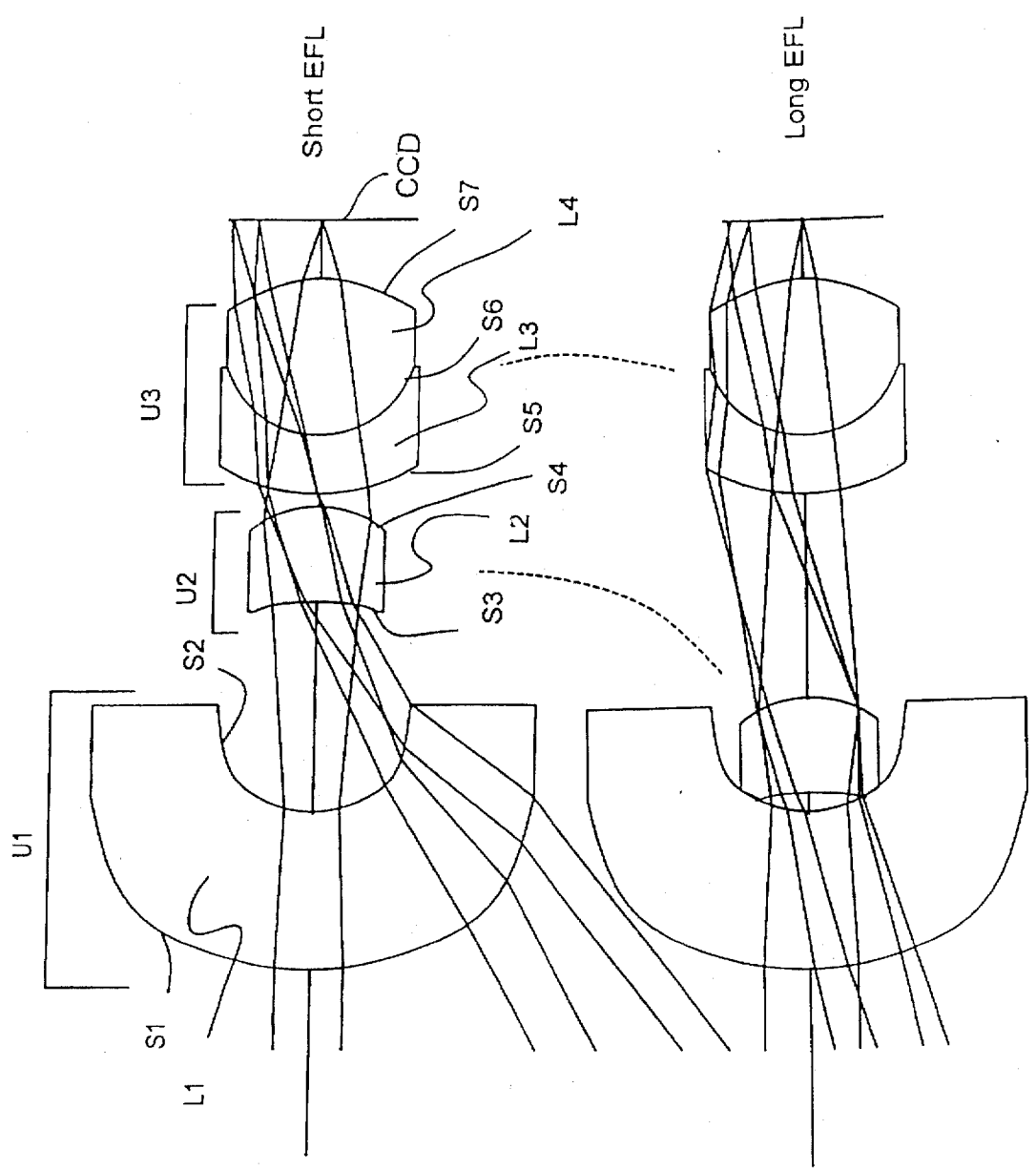

Without intending to limit it in any manner, the present invention is illustrated by the examples of FIGS. 1–9 and the corresponding prescriptions of Tables 1–9. Lens units, lens elements, and lens surfaces are identified by "U", "L", and "S" numbers, respectively, in the figures.

As is conventional, the figures are drawn with the long conjugate on the left and the short conjugate on the right. Accordingly, in the typical application of the invention, the object to be viewed will be on the left and an electronic imaging system, e.g., a system employing a CCD, will be on the right.

The glasses and plastics referred to in Tables 1–9 are set forth in Table 10, where the glass names are the SCHOTT and HOYA designations. Equivalent materials made by other manufacturers can be used in the practice of the invention.

The aspheric coefficients set forth in the tables are for use in the following equation:

$$z = \frac{cy^2}{1+[1-(1+k)c^2y^2]^{1/2}} + ADy^4 +$$

$$AEy^6 + AFy^8 + AGy^{10} + AHy^{12} + AIy^{14}$$

where z is the surface sag at a distance y from the optical axis of the system, c is the curvature of the lens at the optical axis, and k is a conic constant, which is zero except where indicated.

The abbreviations used in the tables are as follows: SN—surface number; CLR. AP.—clear aperture; FIELD—half field of view; EFL—effective focal length; FVD—front vertex distance; f/—f-number; BFL—back focal length; ENP—entrance pupil; EXP—exit pupil, and BRL—barrel length. The designations "a" and "ac" associated with various surfaces represent "aspheric" and "aspheric with a conic constant", respectively. The asterisks used in Tables 4 and 5 represent a diffractive surface. All dimensions given in the tables are in millimeters.

Example 1

This example shows a three element zoom lens system having a negative first lens unit, a positive second lens unit, and a positive third lens unit. The first lens unit is fixed during zooming, the second lens unit provides the change in magnification of the system, and the third lens unit is the compensator. This system provides a 1.7 zoom ratio from 3.8 mm to 6.5 mm.

Example 2

This example shows another three element zoom lens system having a negative first lens unit which remains fixed during zooming, a positive second lens unit which moves to change the system's focal length, and a positive third lens unit which serves as the compensator. This system has a 2.0 zoom ratio and a maximum field of view of 72° at an aperture of f/1.7. The lens system of this example has a larger field of view, i.e., a shorter focal length, than that of Example 1 and uses the thickness of the front lens element to provide a higher level of field curvature correction than in Example 1.

Example 3

This example illustrates the use of a color correcting doublet in the third lens unit. As in Examples 1 and 2, the first lens unit is negative and remains fixed during zooming, the second lens unit is positive and moves to change the system's focal length, and the third lens unit is positive and serves as the compensator. The zoom ratio for this system is 1.84.

Examples 4 and 5

These examples illustrate the use of a diffractive surface (S6/S7) in the third lens unit to provide for color correction. The asterisks in the tables for these examples represent the index of refraction and the Abbe numbers used in the Sweatt model for a diffractive surface, e.g., a $N_e$ value of 9999 and a $V_e$ value of −3.4. See W. C. Sweatt, "Mathematical Equivalence between a Holographic Optical Element and an Ultra High Index Lens," *Journal of the Optical Society of America*, 69:486–487, 1979. In each of these examples, the first lens unit is negative and fixed, the second lens unit is positive and moves for zooming, and the third lens unit is positive and serves as the compensator.

Example 6

This example illustrates the use of a positive lens unit (U4) on the object side of the first lens unit (U1). This positive lens unit serves to increase the zooming range of the system, in this case, to 2.25. The system of this example moves the first lens unit for zooming and the second and third lens units for compensating. The third lens unit includes a color correcting doublet.

Example 7

This example illustrates a system having a distant exit pupil. The first lens unit is negative and fixed during zooming. The second lens unit is positive and moves between the first and third lens units to provide dual power without a change in focus position. The third lens unit is a positive doublet which provides color correction. The aperture stop for this system is within the second lens unit and moves with that unit. For certain applications, e.g., the viewing of documents, the system can be focused at different object distances for its different focal lengths for a constant image distance, e.g., the system can be focused at infinity for its short focal length position and can be focused at a closer distance, e.g., 25–50 centimeters, for its long focal length position.

Example 8

This example is similar to the lens system of Example 2 wherein the third unit has been compounded for color correction. Surfaces S6 and S7 are each approximately paraboloidal so as to provide large surface powers for effective color correction.

Example 9

This example is also similar to the lens system of Example 2. In this case, the third unit is composed of two identical lens elements which allows for enhanced aberration correction without a substantial increase in the overall cost of the system.

Of the foregoing examples, Examples 1–6 are zoom systems, while Examples 7–9 are dual power systems. In particular, Examples 7–9 are designed to produce a 2:1 change in magnification between their long and short focal length positions.

In the case of dual power systems, it should be noted that the same optical elements can be used to produce a magnification range other than 2:1 by simply changing the limits of motion of the second lens unit and the spacing between the lens system and the image plane. This can be done through the use of a lens barrel that includes changeable stops for the second lens unit and a mounting system for the lens barrel which allows for changes in the spacing between the barrel and the image plane. Alternatively, the same lens elements can be used with different lens barrels having different stops and/or with different lens barrel mounts which provide different spacings between the lens system and the image plane.

Tables 11–14 summarize various properties of the lens systems of FIGS. 1–9. In particular, Table 11 sets forth the powers of the first, second, and third units ($\Phi_{U1}$, $\Phi_{U2}$, $\Phi_{U3}$), and the powers of the strongest concave-to-the-image surface of the first and second units ($\Phi_{U1S}$, $\Phi_{U2S}$). Note that the second unit of the lens system of Example 7 does not include a surface that is concave to the image. As shown by this table, all of the lens systems of the invention include at least one concave-to-the-image surface which is strong relative to the power of the unit, i.e., $\Phi_{U1S}/\Phi_{U1}>1.0$ or $\Phi_{U2S}/\Phi_{U2}>1.0$, and many of the systems have such a surface in both the first and second units, i.e., $\Phi_{U1S}/\Phi_{U1}>1.0$ and $\Phi_{U2S}/\Phi_{U2}>1.0$.

Table 12 sets forth the operating magnification of each of the units at its short focal length position ($M_w$) and its long focal length position ($M_t$). In Examples 1–5 and 7–9, the first unit is at the object end of the lens system and thus its operating magnification is always zero. Accordingly, Table 12 does not contain entries for the first unit for these examples.

As is well known, the focal length of an optical system can be expressed as the product of the focal length of the system's unit closest to the object and the product of the operating magnifications of the following units. Accordingly, for a variable focal length system, the unit which contributes most to the change in focal length of the system between its maximum and minimum focal lengths can be determined by forming the ratio of the operating magnifications of the units of the system at the maximum and minimum focal lengths of the system, i.e., $M_t/M_w$. This ratio is set forth in Table 12 and shows that for the lens systems of the invention, it is the second unit which provides the majority of the change in focal length of the system between its maximum and minimum effective focal lengths.

Table 13 sets forth the focal lengths of the first, second, and third units ($f_1$, $f_2$, $f_3$) and compares those focal lengths to the minimum focal length of the system ($f_{min}$). As can be seen in this table, for all of the examples, the first and second lens units are relatively weak in that their focal lengths are greater than 1.3 times the minimum focal length of the system. Similarly, the $f_3/f_{min}$ ratio is greater than 1.3 for all of the examples.

Table 14 sets forth the ratios of the thicknesses ($T_1, T_2, T_3, T_4$, and $T_5$) of the various lens elements of Examples 1–9 to $f_{min}$. As shown in this table, all of the examples have at least one lens element for which the ratio is greater than 0.5, two of the examples (Examples 3 and 9) have two lens elements of this type, five of the examples (Examples 1, 2, 4, 6, and 8) have three such lens elements, and one example (Example 7) has four such elements. The use of thick lens elements in the lens systems of the invention is thus evident from Table 14.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| SN. | RADIUS | THICKNESS | GLASS | CLR. AP. |
|---|---|---|---|---|
| 1a | 10.6068 | 2.94249 | SK5 | 8.78 |
| 2 | 2.8047 | space 1 | | 4.81 |
| 3 | 2.7212 | 3.09514 | FK5 | 4.24 |
| 4ac | 9.2271 | space 2 | | 2.88 |
| 5a | 4.8690 | 2.53252 | SK5 | 2.34 |
| 6 | 127.0755 | | | 2.69 |

CONICS SURF. CONST. - k

| 4 | –1.0000E+00 |
|---|---|

ZOOM THICKNESSES

| EFL | space 1 | space 2 |
|---|---|---|
| 3.8 | 6.123 | 0.000 |
| 4.9 | 4.484 | 1.200 |
| 6.5 | 2.736 | 2.026 |

EVEN POLYNOMIAL ASPHERES

| SN | AD | AE | AF | AG | AH | AI |
|---|---|---|---|---|---|---|
| 1 | 1.5125E–04 | 6.0814E–06 | 1.3343E–07 | –1.1696E–10 | –1.8823E–11 | 0.0000E+00 |
| 4 | 9.1628E–03 | 1.4307E–03 | 3.3105E–04 | 1.5987E–04 | 2.5426E–06 | 7.5636E–06 |
| 5 | –6.5629E–03 | 2.1341E–03 | 8.2481E–04 | –3.0731E–04 | –2.7285E–04 | 6.4932E–05 |

SYSTEM FIRST ORDER PROPERTIES, POS 1
FIELD: 32.0°   f/2.80
STOP: 0.00 after surface 4. DIA: 1.8567

| EFL: | 3.80557 | FVD: | 18.2149 | ENP: | 6.94365 |
|---|---|---|---|---|---|
| BFL: | 3.52208 | BRL: | 14.6929 | EXP: | –1.57966 |

SYSTEM FIRST ORDER PROPERTIES, POS 2
FIELD: 23.0°   f/2.80
STOP: 1.20 after surface 4. DIA: 1.9723

| EFL: | 4.89295 | FVD: | 18.1558 | ENP: | 7.42769 |
|---|---|---|---|---|---|
| BFL: | 3.90117 | BRL: | 14.2547 | EXP: | –1.57966 |

SYSTEM FIRST ORDER PROPERTIES, POS 3

TABLE 1-continued

FIELD: 19.0°  f/2.80
STOP: 2.03 after surface 4. DIA: 2.3075

EFL: 6.49324  FVD: 18.1529  ENP: 7.93326
BFL: 4.82045  BRL: 13.3325  EXP: −1.57966

TABLE 2

| SN. | RADIUS | THICKNESS | GLASS | CLR. AP. |
|---|---|---|---|---|
| 1a | 13.3243 | 4.38830 | ACRYLIC | 11.74 |
| 2a | 2.5110 | Space 1 | | 4.83 |
| 3a | 5.3905 | 4.12155 | FC5 | 3.74 |
| 4 | −3.9133 | Space 2 | | 2.62 |
| 5a | 3.0405 | 3.81871 | FC5 | 3.33 |
| 6a | 3.4578 | | | 3.89 |

ZOOM THICKNESS

| EFL | Space 1 | Space 2 |
|---|---|---|
| 2.75 | 4.398 | 0.468 |
| 4.0 | 2.249 | 2.797 |
| 5.5 | 0.644 | 3.998 |

EVEN POLYNOMIAL ASPHERES

| SN | AD | AE | AF | AG | AH | AI |
|---|---|---|---|---|---|---|
| 1 | 1.4639E−03 | 2.6163E−05 | −4.8682E−07 | −5.8626E−09 | 7.8908E−11 | 8.5932E−14 |
| 2 | 8.5350E−03 | 1.5387E−03 | 9.7529E−05 | −8.0871E−06 | −1.8211E−06 | 7.8755E−07 |
| 3 | 1.9156E−03 | −1.1891E−03 | −8.9141E−04 | 5.0152E−04 | −1.1451E−04 | 9.0080E−06 |
| 5 | −5.6232E−03 | −2.0760E−03 | 2.4941E−04 | 9.7952E−05 | 5.5174E−06 | −7.5037E−06 |
| 6 | −6.2186E−02 | 2.4896E−04 | 6.7076E−03 | −5.2346E−04 | −4.7997E−04 | 7.1999E−05 |

SYSTEM FIRST ORDER PROPERTIES, POS 1
FIELD: 36.0°  f/1.70
STOP: 0.00 after surface 4. DIA: 2.5333

EFL: 2.75018  FVD: 20.0004  ENP: 9.81765
BFL: 0.805822  BRL: 19.1946  EXP: −2.14066

SYSTEM FIRST ORDER PROPERTIES, POS 2
FIELD: 26.5°  f/2.10
STOP: 0.00 after surface 4. DIA: 2.5447

EFL: 4.00022  FVD: 20.0005  ENP: 9.19297
BFL: 0.625972  BRL: 19.3746  EXP: −3.67391

SYSTEM FIRST ORDER PROPERTIES, POS 3
FIELD: 18.0°  f/2.50
STOP: 0.00 after surface 4. DIA: 2.5489

EFL: 5.49945  FVD: 20.0002  ENP: 8.56414
BFL: 1.02967  BRL: 18.9706  EXP: −4.67093

TABLE 3

| SN. | RADIUS | THICKNESS | GLASS | CLR. AP. |
|---|---|---|---|---|
| 1a | 16.9962 | 2.50844 | SK5 | 9.06 |
| 2 | 3.1866 | space 1 | | 5.30 |
| 3 | 2.8898 | 3.21633 | FK5 | 4.54 |
| 4ac | 7.1808 | space 2 | | 3.19 |
| 5a | 3.2207 | 1.14834 | SK5 | 2.97 |
| 6 | −3.7108 | 1.44272 | STYRENE | 2.94 |
| 7a | 6.5050 | | | 2.80 |

CONICS SURF. CONST. - k

4    −1.0000E+00

TABLE 3-continued

ZOOM THICKNESSES

| EFL | space 1 | space 2 |
|---|---|---|
| 3.8 | 6.595 | 0.000 |
| 4.9 | 4.885 | 1.093 |
| 6.5 | 3.163 | 1.690 |
| 7.0 | 2.763 | 1.630 |

EVEN POLYNOMIAL ASPHERES

| SN | AD | AE | AF | AG | AH | AI |
|---|---|---|---|---|---|---|
| 1 | 7.7828E−05 | 1.1677E−05 | −8.8761E−08 | −1.3523E−08 | 4.3159E−10 | 0.0000E+00 |
| 4 | 1.0506E−02 | −8.6755E−04 | 1.3016E−03 | 3.3806E−04 | −3.8492E−04 | 8.8656E−05 |
| 5 | 3.1087E−04 | −3.4019E−04 | 5.3088E−04 | 2.4463E−05 | −1.3487E−04 | 3.6458E−05 |
| 7 | 1.0152E−02 | 4.4352E−04 | 3.2070E−04 | 1.6785E−04 | 2.4794E−05 | −1.1762E−05 |

SYSTEM FIRST ORDER PROPERTIES, POS 1
FIELD: 36.0°   f/2.60
STOP: 0.00 after surface 5. DIA: 2.2449

| EFL: | 3.80511 | FVD: | 18.3342 | ENP: | 6.16736 |
|---|---|---|---|---|---|
| BFL: | 3.42291 | BRL: | 14.9113 | EXP: | −1.41523 |

SYSTEM FIRST ORDER PROPERTIES, POS 2
FIELD: 27.0°   f/2.80
STOP: 0.00 after surface 5. DIA: 2.3083

| EFL: | 4.89981 | FVD: | 18.2984 | ENP: | 6.45515 |
|---|---|---|---|---|---|
| BFL: | 4.00483 | BRL: | 14.2935 | EXP: | −1.41523 |

SYSTEM FIRST ORDER PROPERTIES, POS 3
FIELD: 23.0°   f/2.80
STOP: 0.00 after surface 5. DIA: 2.8031

| EFL: | 6.50269 | FVD: | 18.2978 | ENP: | 6.61304 |
|---|---|---|---|---|---|
| BFL: | 5.12847 | BRL: | 13.1693 | EXP: | −1.41523 |

SYSTEM FIRST ORDER PROPERTIES, POS 4
FIELD: 19.0°   f/2.80
STOP: 0.00 after surface 5. DIA: 2.9893

| EFL: | 6.99986 | FVD: | 18.2987 | ENP: | 6.51301 |
|---|---|---|---|---|---|
| BFL: | 5.58981 | BRL: | 12.7089 | EXP: | −1.41523 |

TABLE 4

| SN. | RADIUS | THICKNESS | GLASS | CLR. AP. |
|---|---|---|---|---|
| 1a | 10.6067 | 2.94248 | SK5 | 8.78 |
| 2 | 2.8047 | space 1 |  | 4.81 |
| 3 | 2.7400 | 3.99513 | FCD1 | 4.28 |
| 4ac | 8.6000 | space 2 |  | 2.86 |
| 5a | 5.2500 | 2.53200 | SK5 | 2.34 |
| 6 | diffractive | 0.00100 | ****** | 2.72 |
| 7 | surface |  |  | 2.72 |

CONICS SURF. CONST. - k

| 4 | −1.0000E+00 |
|---|---|

ZOOM THICKNESSES

| EFL | space 1 | space 2 |
|---|---|---|
| 3.8 | 6.123 | 0.000 |
| 4.9 | 4.485 | 1.222 |
| 6.5 | 2.736 | 1.988 |

EVEN POLYNOMIAL ASPHERES

| SN | AD | AE | AF | AG | AH | AI |
|---|---|---|---|---|---|---|
| 1 | 1.5125E−04 | 6.0816E−06 | 1.3344E−07 | −1.1696E−10 | −1.8824E−11 | 0.0000E+00 |
| 4 | 9.1629E−03 | 1.4308E−03 | 3.3106E−04 | 1.5987E−04 | 2.5427E−06 | 7.5641E−06 |

TABLE 4-continued

| | | | | | |
|---|---|---|---|---|---|
| 5 | −6.5630E−03 | 2.1341E−03 | 8.2484E−04 | −3.0732E−04 | −2.7287E−04 | 6.4936E−05 |

SYSTEM FIRST ORDER PROPERTIES, POS 1
FIELD: 32.0°   f/2.80
STOP: 0.00 after surface 4. DIA: 1.8602

| | | | | | |
|---|---|---|---|---|---|
| EFL: | 3.82615 | FVD: | 18.3068 | ENP: | 6.94170 |
| BFL: | 3.61318 | BRL: | 14.6936 | EXP: | −1.61675 |

SYSTEM FIRST ORDER PROPERTIES, POS 2
FIELD: 23.0°   f/2.80
STOP: 1.22 after surface 4. DIA: 1.9765

| | | | | | |
|---|---|---|---|---|---|
| EFL: | 4.91587 | FVD: | 18.2807 | ENP: | 7.44774 |
| BFL: | 4.00305 | BRL: | 14.2776 | EXP: | −1.61675 |

SYSTEM FIRST ORDER PROPERTIES, POS 3
FIELD: 19.0°   f/2.80
STOP: 1.99 after surface 4. DIA: 2.3125

| | | | | | |
|---|---|---|---|---|---|
| EFL: | 6.48543 | FVD: | 18.2817 | ENP: | 7.89910 |
| BFL: | 4.98707 | BRL: | 13.2946 | EXP: | −1.61675 |

TABLE 5

| SN. | RADIUS | THICKNESS | GLASS | CLR. AP. |
|---|---|---|---|---|
| 1a | 11.3121 | 0.92031 | SK5 | 6.64 |
| 2a | 2.5168 | space 1 | | 4.57 |
| 3 | 2.5779 | 2.73342 | KF5 | 3.10 |
| 4ac | 9.3302 | space 2 | | 2.46 |
| 5a | 6.0273 | 1.00000 | SK5 | 2.68 |
| 6 | diffractive | 0.02057 | ****** | 2.71 |
| 7 | surface | | | 2.71 |

CONICS SURF. CONST. - k

| | |
|---|---|
| 4 | −1.0000E+00 |

ZOOM THICKNESSES

| EFL | space 1 | space 2 |
|---|---|---|
| 2.8 | 7.504 | 0.063 |
| 3.5 | 5.926 | 1.390 |
| 4.7 | 4.170 | 2.291 |

EVEN POLYNOMIAL ASPHERES

| SN | AD | AE | AF | AG | AH | AI |
|---|---|---|---|---|---|---|
| 1 | 1.6978E−03 | 2.8210E−04 | −3.7877E−05 | 1.2685E−07 | 1.1266E−07 | −2.2722E−09 |
| 2 | 7.7378E−04 | −3.8418E−04 | 5.0744E−04 | −1.2590E−04 | 4.5972E−06 | 6.1899E−08 |
| 4 | 1.3014E−02 | 2.1291E−02 | −6.3545E−02 | 8.1041E−02 | −4.4352E−02 | 8.8687E−03 |
| 5 | −1.9676E−03 | −5.8404E−03 | 1.0048E−02 | −8.2147E−03 | 3.3279E−03 | −5.2434E−04 |

SYSTEM FIRST ORDER PROPERTIES, POS 1
FIELD: 36.0°   f/2.60
STOP: 0.00 after surface 5. DIA: 1.9529

| | | | | | |
|---|---|---|---|---|---|
| EFL: | 2.76018 | FVD: | 16.5538 | ENP: | 4.42462 |
| BFL: | 4.31250 | BRL: | 12.2413 | EXP: | −.699053 |

SYSTEM FIRST ORDER PROPERTIES, POS 2
FIELD: 27.0°   f/2.80
STOP: 0.00 after surface 5. DIA: 2.1003

| | | | | | |
|---|---|---|---|---|---|
| EFL: | 3.54444 | FVD: | 16.5542 | ENP: | 4.19785 |
| BFL: | 4.56401 | BRL: | 11.9902 | EXP: | −2.31176 |

SYSTEM FIRST ORDER PROPERTIES, POS 3
FIELD: 23.0°   f/2.80
STOP: 0.00 after surface 5. DIA: 2.4543

| | | | | | |
|---|---|---|---|---|---|
| EFL: | 4.70592 | FVD: | 16.5547 | ENP: | 3.87829 |

TABLE 5-continued

BFL: 5.41942 BRL: 11.1353 EXP: −3.77642

TABLE 6

| SN. | RADIUS | THICKNESS | GLASS | CLR. AP. |
|---|---|---|---|---|
| 1 | 12.7245 | 3.00000 | ACRYLIC | 11.10 |
| 2a | 404.1860 | space 1 | | 9.19 |
| 3a | −45.1943 | 2.57119 | SK5 | 9.00 |
| 4 | 3.5966 | space 2 | | 5.35 |
| 5 | 3.1880 | 3.27368 | FK5 | 3.80 |
| 6ac | 6.8115 | space 3 | | 2.90 |
| 7a | 3.4793 | 1.14834 | SK5 | 3.06 |
| 8 | −4.0125 | 1.52903 | STYRENE | 3.03 |
| 9a | 10.9772 | | | 2.93 |

CONICS SURF. CONST. - k

| 6 | −1.0000E+00 |
|---|---|

ZOOM THICKNESSES

| EFL | space 1 | space 2 | space 3 |
|---|---|---|---|
| 4.0 | 0.274 | 7.981 | 0.038 |
| 5.5 | 1.305 | 5.580 | 0.759 |
| 8.0 | 2.386 | 3.179 | 0.896 |
| 9.0 | 3.297 | 2.727 | 0.104 |

EVEN POLYNOMIAL ASPHERES

| SN | AD | AE | AF | AG | AH | AI |
|---|---|---|---|---|---|---|
| 2 | 6.1059E−05 | 2.9993E−06 | −1.6302E−08 | −1.0399E−09 | −1.7818E−11 | 4.5793E−13 |
| 3 | 2.4601E−04 | 9.2334E−06 | −8.4630E−08 | −1.2976E−08 | −2.9683E−10 | 2.3802E−11 |
| 6 | 8.3243E−03 | −2.0301E−03 | 1.1581E−03 | 3.7123E−04 | −3.7992E−04 | 8.1376E−05 |
| 7 | 5.0383E−04 | 1.3227E−04 | −2.5209E−05 | −1.8024E−05 | 2.1934E−06 | 5.0602E−06 |
| 9 | 7.7885E−03 | 4.4442E−04 | 1.1285E−04 | 2.6862E−05 | −3.7025E−06 | −1.7560E−06 |

SYSTEM FIRST ORDER PROPERTIES, POS 1
FIELD: 29.0°  f/2.60
STOP: 0.00 after surface 6. DIA: 2.2609

EFL: 3.99978 FVD: 23.5006 ENP: 10.4532
BFL: 3.68488 BRL: 19.8157 EXP: −1.57165

SYSTEM FIRST ORDER PROPERTIES, POS 2
FIELD: 23.0°  f/2.80
STOP: 0.00 after surface 6. DIA: 2.3814

EFL: 5.50059 FVD: 23.4999 ENP: 11.9398
BFL: 4.33332 BRL: 19.1666 EXP: −2.23994

SYSTEM FIRST ORDER PROPERTIES, POS 3
FIELD: 15.0°  f/2.80
STOP: 0.00 after surface 6. DIA: 2.7787

EFL: 8.00048 FVD: 23.5004 ENP: 13.3951
BFL: 5.51748 BRL: 17.9829 EXP: −2.38151

SYSTEM FIRST ORDER PROPERTIES, POS 4
FIELD: 13.0°  f/2.80
STOP: 0.00 after surface 6. DIA: 2.8669

EFL: 9.00135 FVD: 23.4998 ENP: 15.3327
BFL: 5.84972 BRL: 17.6500 EXP: −1.62798

TABLE 7

| SN. | RADIUS | THICKNESS | GLASS | CLR. AP. |
|---|---|---|---|---|
| 1a | 6.2798 | 3.81301 | ACRYLIC | 10.53 |
| 2a | 2.3184 | Space 1 | | 4.62 |
| 3a | −8.6346 | 2.28707 | FK5 | 2.70 |

TABLE 7-continued

| | | | | | |
|---|---|---|---|---|---|
| 4a | −2.5287 | Space 2 | | 3.04 | |
| 5a | 4.4628 | 1.42354 | SF2 | 4.68 | |
| 6 | 2.3232 | 3.76900 | FK5 | 4.18 | |
| 7a | −2.4592 | | | 4.46 | |

EVEN POLYNOMIAL ASPHERES

| SN | AD | AE | AF | AG | AH | AI |
|---|---|---|---|---|---|---|
| 1 | −1.2527E−03 | −7.9555E−07 | 1.4713E−06 | 5.5037E−08 | 1.5157E−09 | −9.3093E−12 |
| 2 | −1.2812E−02 | −8.1660E−05 | −2.8414E−04 | −1.1018E−05 | 1.6584E−05 | 6.2920E−06 |
| 3 | −6.9214E−03 | −1.1828E−02 | −2.6848E−03 | 1.3200E−03 | 8.4427E−04 | −2.8703E−04 |
| 4 | 5.8279E−03 | −5.1619E−03 | −5.5055E−04 | 7.3209E−04 | 2.3819E−04 | −1.1639E−04 |
| 5 | −2.1316E−03 | 6.1825E−04 | 9.9131E−07 | −4.8820E−06 | −1.5303E−06 | 2.2678E−07 |
| 7 | 2.9516E−02 | −1.6791E−03 | −1.9826E−04 | 3.9826E−05 | 2.0340E−05 | −2.2356E−06 |

ZOOM THICKNESSES

| EFL | Space 1 | Space 2 |
|---|---|---|
| 2.75 | 5.053 | 0.323 |
| 5.50 | 0.450 | 4.926 |

SYSTEM FIRST ORDER PROPERTIES, POS 1
FIELD: 38.0°  f/1.70
STOP: 1.14 after surface 3. DIA: 2.3232

| | | | | | |
|---|---|---|---|---|---|
| EFL: | 2.75008 | FVD: | 18.0732 | ENP: | 8.64115 |
| BFL: | 1.40448 | BRL: | 16.6687 | EXP: | −47.9927 |

SYSTEM FIRST ORDER PROPERTIES, POS 2
FIELD: 18.0°  f/2.50
STOP: 1.14 after surface 3. DIA: 2.1085

| | | | | | |
|---|---|---|---|---|---|
| EFL: | 5.50013 | FVD: | 18.0731 | ENP: | 4.82781 |
| BFL: | 1.40448 | BRL: | 16.6686 | EXP: | 8.17937 |

TABLE 8

| SN. | RADIUS | THICKNESS | GLASS | CLR. AP. |
|---|---|---|---|---|
| 1 | 8.4213 | 4.14796 | POLYCARB | 12.31 |
| 2ac | 2.5363 | Space 1 | | 5.89 |
| 3a | 6.4257 | 5.50000 | ACRYLIC | 4.76 |
| 4 | −5.3740 | Space 2 | | 5.03 |
| 5a | 4.9351 | 2.62000 | ACRYLIC | 4.59 |
| 6ac | −2.6931 | 0.02000 | | 4.61 |
| 7ac | −2.4850 | 1.45000 | POLYCARB | 4.55 |
| 8a | 14.9612 | | | 4.52 |

CONICS SURF. CONST. - k

| | |
|---|---|
| 2 | −1.0000E+00 |
| 6 | −1.0000E+00 |
| 7 | −1.0000E+00 |

EVEN POLYNOMIAL ASPHERES

| SN. | AD | AE | AF | AG | AH | AI |
|---|---|---|---|---|---|---|
| 2 | 4.7387E−03 | 2.0774E−04 | 4.0578E−05 | −1.7764E−06 | −2.9975E−07 | 6.5544E−08 |
| 3 | −4.9014E−04 | −7.3601E−05 | −1.6738E−07 | −9.2270E−07 | −1.8249E−07 | 6.9122E−08 |
| 5 | −1.6121E−03 | 8.8969E−05 | −4.9125E−05 | −5.4489E−06 | 1.2664E−07 | −2.1226E−08 |
| 6 | −1.7529E−03 | 4.6796E−05 | 3.3765E−05 | 4.3332E−06 | 7.0086E−08 | 2.8772E−08 |
| 7 | 1.7980E−03 | 2.3259E−04 | 1.4868E−05 | 1.5478E−06 | 6.0858E−07 | 5.8231E−08 |
| 8 | 4.7626E−03 | −2.8658E−04 | 2.9452E−05 | 1.0259E−05 | −7.7642E−08 | −3.8091E−07 |

ZOOM THICKNESSES

| EFL | Space 1 | Space 2 |
|---|---|---|
| 4.0 | 7.844 | 0.384 |
| 8.0 | 2.847 | 5.380 |

SYSTEM FIRST ORDER PROPERTIES, POS 1
FIELD: 34.5°  f/1.80

TABLE 8-continued

STOP: 3.63 after surface 3. DIA: 4.0816

| | | | | | |
|---|---|---|---|---|---|
| EFL: | 3.99991 | FVD: | 25.0803 | ENP: | 9.45134 |
| BFL: | 3.11468 | BRL: | 21.9656 | EXP: | −3.57716 |

SYSTEM FIRST ORDER PROPERTIES, POS 2
FIELD: 18.9°  f/2.30
STOP: 3.63 after surface 3. DIA: 4.6708

| | | | | | |
|---|---|---|---|---|---|
| EFL: | 7.99984 | FVD: | 25.0803 | ENP: | 7.89693 |
| BFL: | 3.11493 | BRL: | 21.9654 | EXP: | −7.75983 |

TABLE 9

| SN. | RADIUS | THICKNESS | GLASS | CLR. AP. |
|---|---|---|---|---|
| 1a | 15.7205 | 7.27585 | STYRENE | 18.38 |
| 2 | 3.2659 | Space 1 | | 6.43 |
| 3a | 6.2738 | 4.20811 | ACRYLIC | 4.56 |
| 4a | −5.3778 | Space 2 | | 4.44 |
| 5a | 3.6080 | 1.44262 | ACRYLIC | 4.82 |
| 6a | 5.4227 | 1.16042 | | 5.08 |
| 7a | −5.4227 | 1.44262 | ACRYLIC | 5.14 |
| 8a | −3.6080 | | | 5.05 |

EVEN POLYNOMIAL ASPHERES

| SN. | AD | AE | AF | AG | AH | AI |
|---|---|---|---|---|---|---|
| 1 | 1.0654E−04 | −1.6347E−06 | 4.8346E−08 | −4.1311E−10 | −6.4586E−13 | 2.5285E−14 |
| 3 | −1.6510E−03 | 2.2595E−04 | −8.7853E−05 | 3.8498E−06 | 9.6269E−07 | −7.2923E−08 |
| 4 | −1.1892E−03 | −1.9645E−04 | 1.1723E−04 | −9.3873E−06 | −2.5734E−06 | 2.9434E−07 |
| 5 | −3.8633E−03 | −4.5747E−04 | 2.0174E−05 | −3.2030E−06 | −1.0994E−06 | −9.8583E−08 |
| 6 | −1.4714E−03 | −1.6908E−04 | −7.8496E−05 | −6.8306E−06 | −2.5379E−07 | 1.0984E−07 |
| 7 | −1.4714E−03 | 1.6908E−04 | 7.8496E−05 | 6.8306E−06 | 2.5379E−07 | −1.0984E−07 |
| 8 | 3.8633E−03 | 4.5747E−04 | −2.0174E−05 | 3.2030E−06 | 1.0994E−06 | 9.8583E−08 |

ZOOM THICKNESSES

| EFL | Space 1 | Space 2 |
|---|---|---|
| 4.0 | 6.974 | 2.041 |
| 8.0 | 2.269 | 6.746 |

SYSTEM FIRST ORDER PROPERTIES, POS 1
FIELD: 38.0°  f/1.80
STOP: 1.73 after surface 4. DIA: 2.8883

| | | | | | |
|---|---|---|---|---|---|
| EFL: | 4.00007 | FVD: | 26.3094 | ENP: | 12.6909 |
| BFL: | 1.76484 | BRL: | 24.5446 | EXP: | −4.73970 |

SYSTEM FIRST ORDER PROPERTIES, POS 2
FIELD: 18.0°  f/2.50
STOP: 1.75 after surface 4. DIA: 3.3551

| | | | | | |
|---|---|---|---|---|---|
| EFL: | 7.99927 | FVD: | 26.3093 | ENP: | 11.7544 |
| BFL: | 1.76473 | BRL: | 24.5446 | EXP: | −22.6580 |

TABLE 10

| MATERIAL | $N_e$ | $V_e$ |
|---|---|---|
| ACRYLIC | 1.4935 | 57.3 |
| FK5 | 1.4891 | 70.2 |
| SK5 | 1.5914 | 61.0 |
| FC5 | 1.4891 | 70.2 |
| FCD1 | 1.4984 | 81.2 |
| POLYCARB | 1.5901 | 29.6 |
| STYRENE | 1.5949 | 30.7 |
| SF2 | 1.6522 | 33.6 |

TABLE 11

| Example | $\Phi_{U1}$ | $\Phi_{U1S}$ | $\Phi_{U1S}/\Phi_{U1}$ | $\Phi_{U2}$ | $\Phi_{U2S}$ | $\Phi_{U2S}/\Phi_{U2}$ | $\Phi_{U3}$ |
|---|---|---|---|---|---|---|---|
| 1 | −.133 | −.211 | 1.59 | .146 | .179 | 1.23 | .118 |
| 2 | −.138 | −.197 | 1.43 | .184 | .091 | 0.49 | .078 |
| 3 | −.141 | −.185 | 1.31 | .126 | .169 | 1.34 | .119 |
| 4 | −.133 | −.211 | 1.59 | .146 | .182 | 1.25 | .113 |
| 5 | −.175 | −.235 | 1.34 | .155 | .189 | 1.22 | .111 |
| 6 | −.181 | −.165 | 0.91 | .106 | .153 | 1.44 | .130 |
| 7 | −.092 | −.213 | 2.32 | .154 | — | — | .216 |
| 8 | −.120 | −.233 | 1.94 | .143 | .076 | 0.53 | .026 |
| 9 | −.115 | −.180 | 1.57 | .150 | .079 | 0.53 | .096 |

TABLE 12

| EXAMPLE | UNIT 1 | | | UNIT 2 | | | UNIT 3 | | |
|---|---|---|---|---|---|---|---|---|---|
| | $M_w$ | $M_t$ | $M_t/M_w$ | $M_w$ | $M_t$ | $M_t/M_w$ | $M_w$ | $M_t$ | $M_t/M_w$ |
| 1 | | | | −1.29 | −3.62 | 2.81 | .39 | .24 | .62 |
| 2 | | | | −.74 | −1.53 | 2.07 | .51 | .50 | .98 |
| 3 | | | | −1.88 | −20.70 | 11.01 | .28 | .048 | .17 |
| 4 | | | | −1.33 | −3.86 | 2.90 | .38 | .22 | .58 |
| 5 | | | | −1.08 | −2.43 | 2.25 | .45 | .34 | .76 |
| 6 | −.32 | −.39 | 1.22 | −2.12 | 22.40 | −10.57 | .22 | −.039 | −.18 |
| 7 | | | | −.71 | −1.42 | 2.00 | .36 | .36 | 1.00 |
| 8 | | | | −.70 | −1.40 | 2.00 | .33 | .33 | 1.00 |
| 9 | | | | −.71 | −1.42 | 2.00 | .63 | .63 | 1.00 |

TABLE 13

| EXAMPLE | $f_1$ | $f_2$ | $f_3$ | $f_{min}$ | $|f_1|/f_{min}$ | $f_2/f_{min}$ | $|f_3|/f_{min}$ |
|---|---|---|---|---|---|---|---|
| 1 | −7.50 | 6.83 | 8.47 | 3.80 | 1.97 | 1.80 | 2.22 |
| 2 | −7.25 | 5.43 | 12.80 | 2.75 | 2.64 | 1.97 | 4.65 |
| 3 | −7.11 | 7.93 | 8.40 | 3.80 | 1.87 | 2.09 | 2.20 |
| 4 | −7.50 | 6.86 | 8.85 | 3.82 | 1.96 | 1.80 | 2.31 |
| 5 | −5.70 | 6.43 | 9.00 | 2.76 | 2.07 | 2.33 | 3.26 |
| 6 | −5.52 | 9.45 | 7.69 | 4.00 | 1.38 | 2.36 | 1.92 |
| 7 | −10.90 | 6.51 | 4.63 | 2.75 | 3.96 | 2.37 | 1.68 |
| 8 | −8.33 | 7.01 | 38.46 | 4.00 | 2.08 | 1.75 | 9.63 |
| 9 | −8.66 | 6.66 | 10.40 | 4.00 | 2.17 | 1.67 | 2.60 |

TABLE 14

| EXAMPLE | $T_1/f_{min}$ | $T_2/f_{min}$ | $T_3/f_{min}$ | $T_4/f_{min}$ | $T_5/min$ |
|---|---|---|---|---|---|
| 1 | .77 | .81 | .66 | | |
| 2 | 1.60 | 1.49 | 1.39 | | |
| 3 | .66 | .85 | .30 | .38 | |
| 4 | .77 | .81 | .66 | | |
| 5 | .33 | .99 | .36 | | |
| 6 | .75 | .64 | .82 | .29 | .38 |
| 7 | 1.38 | .83 | .52 | 1.37 | |
| 8 | 1.04 | 1.37 | .66 | .36 | |
| 9 | 1.82 | 1.05 | .36 | .36 | |

What is claimed is:

1. A variable power lens system for forming an image of an object, said system having a minimum focal length $f_{min}$ and comprising:

(a) a first lens unit having a negative power and a focal length $f_1$;

(b) a second lens unit which (i) is on the image side of said first lens unit, (ii) has a positive power, and (iii) has a focal length $f_2$; and (c) a third lens unit which is on the image side of said second lens unit, said third lens unit having a focal length $f_3$;

wherein:

the focal length of the lens system is changed by changing the spacing between the first lens unit and the second lens unit;

the ratio of $f_2$ to $f_{min}$ is greater than about 1.3; and the first lens unit includes only negative lens elements, has a negative power $\Phi_{U1}$ equal to $1/f_1$, and includes a lens surface that:

(i) is concave to the image, and (ii) has a negative power $\Phi_{U1S}$, the ratio of $\Phi_{U1S}$ to $\Phi_{U1}$ being greater than 1.0.

2. The variable power lens system of claim 1 wherein the ratio of the absolute value of $f_1$ to $f_{min}$ is greater than about 1.3.

3. The variable power lens system of claim 1 wherein the ratio of the absolute value of $f_3$ to $f_{min}$ is greater than about 1.3.

4. The variable power lens system of claim 2 wherein the ratio of the absolute value of $f_3$ to $f_{min}$ is greater than about 1.3.

5. A variable power lens system for forming an image of an object, said system having a minimum focal length $f_{min}$, a maximum effective focal length $f_{max}$, and comprising:

(a) a first lens unit having a negative power and a focal length $f_1$;

(b) a second lens unit which (i) is on the image side of said first lens unit, (ii) has a positive power, and (iii) has a focal length $f_2$; and (c) a third lens unit which is on the image side of said second lens unit, said third lens unit having a focal length $f_3$;

wherein:

the focal length of the lens system is changed by changing the spacing between the first lens unit and the second lens unit;

the ratio of $f_2$ to $f_{min}$ is greater than about 1.3;

the first lens unit includes only negative lens elements;

the second lens unit is moveable to change the magnification of the lens system and includes only positive lens elements;

at least one of the first and third lens units is moveable; and the movement of the second lens unit provides the majority of the change in focal length of the lens system between its maximum and minimum effective focal lengths.

6. A variable power lens system for forming an image of an object, said system having a minimum focal length $f_{min}$ and comprising:

(a) a first lens unit having a negative power and a focal length $f_1$;

(b) a second lens unit which (i) is on the image side of said first lens unit, (ii) has a positive power, and (iii) has a focal length $f_2$;

(c) a third lens unit which is on the image side of said second lens unit, said third lens unit having a focal length $f_3$; and (d) a fourth lens unit on the object side of the first lens unit, said fourth lens unit having a positive power;

wherein:

the focal length of the lens system is changed by changing the spacing between the first lens unit and the second lens unit; and the ratio of $f_2$ to $f_{min}$ is greater than about 1.3.

7. A variable power lens system for forming an image of an object, said system having a minimum focal length $f_{min}$ and comprising:
   (a) a first lens unit having a negative power and a focal length $f_1$;
   (b) a second lens unit which (i) is on the image side of said first lens unit, (ii) has a positive power, (iii) has a focal length $f_2$, and (iv) consists of a single lens element; and
   (c) a third lens unit which is on the image side of said second lens unit, said third lens unit having a focal length $f_3$;
   wherein:
   the focal length of the lens system is changed by changing the spacing between the first lens unit and the second lens unit;
   the ratio of $f_2$ to $f_{min}$ is greater than about 1.3;
   the second lens unit has a positive optical power $\Phi_{U2}$ equal to $1/f_2$, and includes a lens surface that:
   (i) is concave to the image, and
   (ii) has a positive optical power $\Phi_{U2S}$, the ratio of $\Phi_{U2S}$ to $\Phi_{U2}$ being greater than 1.0; and
   the third lens unit has a positive optical power.

8. A variable power lens system for forming an image of an object, said system having a minimum focal length $f_{min}$ and comprising:
   (a) a first lens unit having a negative power and a focal length $f_1$;
   (b) a second lens unit which (i) is on the image side of said first lens unit, (ii) has a positive power, and (iii) has a focal length $f_2$; and
   (c) a third lens unit which is on the image side of said second lens unit, said third lens unit having a focal length $f_3$;
   wherein:
   the focal length of the lens system is changed by changing the spacing between the first lens unit and the second lens unit; and
   the lens system includes at least one lens element for which the ratio of the thickness of the element to $f_{min}$ is greater than about 0.5.

9. The variable power lens system of claim 8 wherein the lens system includes at least two lens elements for which the ratio of the thickness of the element to $f_{min}$ is greater than about 0.5.

10. The variable power lens system of claim 9 wherein the lens system includes at least three lens elements for which the ratio of the thickness of the element to $f_{min}$ is greater than about 0.5.

11. The variable power lens system of claim 8 wherein the ratio of the absolute value of $f_1$ to $f_{min}$ or the ratio of $f_2$ to $f_{min}$ is greater than about 1.3.

12. The variable power lens system of claims 8 or 7 wherein the first lens unit includes only negative lens elements, has a negative power $\Phi_{U1}$ equal to $1/f_1$, and includes a lens surface that:
    (i) is concave to the image, and
    (ii) has a negative power $\Phi_{U1S}$, the ratio of $\Phi_{U1S}$ to $\Phi_{U1}$ being greater than 1.0.

13. The variable power lens system of claims 1, 8, or 6 wherein:
    the second lens unit has a positive optical power $\Phi_{U2}$ equal to $1/f_2$, and includes a lens surface that:
    (i) is concave to the image, and
    (ii) has a positive optical power $\Phi_{U2S}$, the ratio of $\Phi_{U2S}$ to $\Phi_{U2}$ being greater than 1.0; and
    the third lens unit has a positive optical power.

14. The variable power lens system of claims 1, 8, 5, 6, or 7 wherein the third lens unit has at least two surfaces that have optical power, the surface closest to the image having an overall shape which is concave to the image.

15. The variable power lens system of claims 1, 8, or 6 wherein:
    the third lens unit has at least two surfaces that have optical power, the surface closest to the image having an overall shape which is concave to the image; and
    the second lens unit includes at least two surfaces that have optical power, the surface closest to the image having an overall shape which is concave to the image.

16. The variable power lens system of claims 1, 8, or 6 wherein:
    the second lens unit includes at least two surfaces that have optical power, the surface closest to the image having an overall shape which is concave to the image; and
    the third lens unit has a positive power.

17. The variable power lens system of claims 1 or 8 wherein the system has a maximum effective focal length $f_{max}$ and wherein:
    the first lens unit includes only negative lens elements;
    the second lens unit is moveable to change the magnification of the lens system and includes only positive lens elements;
    at least one of the first and third lens units is moveable; and
    the movement of the second lens unit provides the majority of the change in focal length of the lens system between its maximum and minimum effective focal lengths.

18. A variable power lens system for forming an image of an object, said system having a minimum focal length $f_{min}$ and consisting of, from the object side: a positive first lens element; a negative second lens element that moves for zooming; a positive third lens element that moves for compensating; and a positive lens unit, wherein the positive third lens element has a thickness which is greater than about 0.5 times $f_{min}$.

19. A variable power lens system for forming an image of an object, said system consisting of, from the object side: a positive first lens element; a negative second lens element that moves for zooming; a positive third lens element that moves for compensating; and a positive lens unit, wherein the positive third lens element is a meniscus element.

20. The variable power lens system of claim 19 wherein the meniscus element is convex towards the object.

21. A variable power lens system for forming an image of an object, said system comprising:
    (a) a first lens unit having a negative power and including only negative lens elements;
    (b) a second lens unit which is on the image side of said first lens unit and has a positive power, said second lens unit being moveable to change the magnification of the lens system and including only positive lens elements; and
    (c) a third lens unit which is on the image side of said second lens unit, said third lens unit including means for correcting the lens system's chromatic aberration.

22. The variable power lens system of claim 21 wherein the means for correcting the lens system's chromatic aberration comprises a diffractive optics surface.

23. The variable power lens system of claim 21 wherein the means for correcting the lens system's chromatic aberration comprises a color-correcting doublet.

24. The variable power lens system of claim 23 wherein the each of the lens elements of the doublet include an approximately paraboloidal surface.

25. The variable power lens system of claims 1, 8, or 21 further comprising a fourth lens unit on the object side of the first lens unit, said fourth lens unit having a positive power.

26. A variable power lens system for forming an image of an object, said system having a minimum focal length $f_{min}$ and consisting of, from the best side: a positive first lens element; a negative second lens element that moves for zooming; a positive third lens element that moves for compensating; and a positive lens unit, wherein the negative second lens element has a thickness which is greater than about 0.5 times $f_{min}$.

27. The variable power lens system of claims 26, 18, or 19 wherein the positive lens unit comprises a color correcting doublet.

28. The variable power lens system of claims 1, 8, 21, 26, 5, 6, 7, 18, or 19 wherein the system includes at least one aspheric surface.

29. The variable power lens system of claims 1, 8, 21, 26, 5, 6, 7, 18 or 19 wherein the system is a zoom lens system.

30. An optical system comprising the lens system of claims 1, 8, 21, 26, 5, 6, 7, 18 or 19 and an electronic imaging system for detecting the image produced by the lens system.

31. The optical system of claim 30 wherein the electronic imaging system comprises a charged coupled device.

32. An optical system comprising a variable power lens system for forming an image of an object and an electronic imaging system for detecting said image, said lens system comprising three lens units at least one of which consists of a single lens element whose thickness is at least about 0.5 times the diagonal of the image.

33. The optical system of claim 32 wherein the electronic imaging system comprises a charged couple device.

34. An optical system comprising a variable power lens system for forming an image of an object and an electronic imaging system for detecting said image, said electronic imaging system comprising an electronic component having a light sensitive surface and said lens system comprising three lens units at least one of which consists of a single lens element whose thickness is at least about 0.5 times the maximum transverse dimension of said light sensitive surface.

35. The optical system of claim 34 wherein the electronic component is a charged couple device (CCD) and said maximum transverse dimension is the diagonal of the CCD's light sensitive surface.

* * * * *